US007969894B2

(12) United States Patent
Mangal

(10) Patent No.: US 7,969,894 B2
(45) Date of Patent: Jun. 28, 2011

(54) SYSTEM AND METHOD FOR DEAD GATEWAY DETECTION

(75) Inventor: Premnath Mangal, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 131 days.

(21) Appl. No.: 12/141,942

(22) Filed: Jun. 19, 2008

(65) Prior Publication Data

US 2009/0279426 A1      Nov. 12, 2009

(30) Foreign Application Priority Data

May 7, 2008    (IN) .......................... 1121/CHE/2008

(51) Int. Cl.
    *G06F 11/00*           (2006.01)
(52) U.S. Cl. .................. 370/242; 370/218; 370/250
(58) Field of Classification Search ............ 370/242
    See application file for complete search history.

(56) References Cited

U.S. PATENT DOCUMENTS

| 6,826,623 | B1 | 11/2004 | Quigg Brown et al. | |
| 7,664,044 | B2 * | 2/2010 | Zhai .............................. | 370/242 |
| 2003/0088698 | A1 * | 5/2003 | Singh et al. .................... | 709/239 |
| 2007/0180104 | A1 * | 8/2007 | Filsfils et al. ................... | 709/224 |
| 2009/0046723 | A1 * | 2/2009 | Rahman et al. ........... | 370/395.31 |

OTHER PUBLICATIONS

Narten. RFC 3692. Network Working Group. Jan. 2004.*
ARP spoofing, http://en.wikipedia.org/wiki/ARP_spoofing, Publication Date Oct. 16, 2010.
The Cable Guy,Default Gateway Behavior for Windows TCP/IP, TechNet Library,Sep. 2003 , http://www.microsoft.com/technet/community/columns/cableguy/cg0903.mspx#E5H.
Julian Anastasov,Alternative Routes and Dead Gateway Detection for Linux,Oct. 2001, http://www.ssi.bg/~ja/dgd-usage.txt.
Bugs in Linux 2.4 masq + nexthop? (was Re: A question about multipath routing . . . ), http://www.uwsg.iu.edu/hypermail/linux/net/0111.1/0008.html, Publication date Nov. 9, 2001.
Microsoft, "Default Gateway Behavior for Windows TCP/IP," The Cable Guy—Sep. 2003, 6 pp. [Online] http://technet.microsoft.com/en-us/library/bb878104(printer).aspx.
Julian Anastason, "Alternative Routes and Dead Gateway Detection for Linux," Oct. 2001, 13 pp.
Zblaxel@furryterror.org, "Bugs in Linux 2.4 masq + nexthop? (was Re: a question about multipath routing . . . )," Nov. 9, 2001, 3 pp. [Online] http://lkm.indiana.edu/hypermail/linux/net/0111.1/0008.html.

(Continued)

*Primary Examiner* — Jason E Mattis
*Assistant Examiner* — Stephen J Clawson

(57) ABSTRACT

A system and method for detecting a next-hop dead gateway is disclosed. In one embodiment, a method for detecting the next-hop dead gateway includes sending an Internet Protocol (IP) packet by a host to a next-hop gateway associated with the host, receiving the IP packet by the host from the next-hop gateway upon reviewing a routing table and the destination field in the IP header associated with the IP packet, determining whether the IP packet is received from the next-hop gateway within a first predetermined time interval, if so, declaring the next-hop gateway as alive, and if not, declaring the next-hop gateway as dead. In some embodiments, source and destination fields in IP header associated with the IP packet include IP address associated with the host. The method may further include encapsulating the IP packet with a data link layer protocol associated with the host and the next-hop gateway.

11 Claims, 6 Drawing Sheets

OTHER PUBLICATIONS

W. Richard Stevens, "TCP/IP Illustrated, vol. 1: The Protocols," 1st Edition, Dec. 15, 1993, 16 pp.

Stevens et al., "UNIX Network Programming vol. 1, Third Edition: The Sockets Networkinig," Nov. 21, 2003, 32 pp.

Synnergy, "Techniques to Validate Host-Connectivity," whitepaper by dethy, dethy@synnergy.net, Synnergy Networks, Copyright 1998-2001, 12 pp. [Online] http://web.archive.org/web/20050305223126/http://www.synnergy.net/downloads/papers/h . . .

"ARP spoofing," Mar. 28, 2006, 3 pp. [Online] http://web.archive.org/web/20060512210751/http://en.wikipedia.org/wiki/ARP Spoofing.

Altunbasak et al., "Securing Layer 2 in Local Area Networks," 2005, pp. 699-706.

http://en.wikipedia.org/wiki/Arp_flooding, entire document, Publication Date Nov. 27, 2010.

W. Richard Stevens, TCP/IP Illustrated, vol. 1: The Protocols, Dec. 15, 1993, Chapter 1 to 9, Addison Wesley.

W. Richard Stevens et al., UNIX Network Programming vol. 1, Third Edition: The Sockets Networking API, Nov. 21, 2003, Chapter 1 to 9, Addison Wesley.

* cited by examiner

SYSTEM AND METHOD FOR DEAD GATEWAY DETECTION

RELATED APPLICATIONS

Benefit is claimed under 35 U.S.C. 119(a)-(d) to Foreign application Serial No. 1121/CHE/2008 entitled "SYSTEM AND METHOD FOR DEAD GATEWAY DETECTION" by Hewlett-Packard Development Company, L.P., filed on 7 May, 2008, which is herein incorporated in its entirety by reference for all purposes.

BACKGROUND

Digital packets of information may be communicated between an organization's internal network and the public Internet. Many organizations use Internet gateways, implemented by computer workstations executing software, to provide a connection between the internal network and the Internet. These Internet gateways can include firewall protection for the internal network, in addition, to providing connectivity between the internal network and the Internet. Where an organization uses more than one Internet gateway, each user on the organization's internal network can, for example, be assigned to a designated Internet gateway. The users of the internal network are thereby provided access to the Internet through the designated Internet gateways.

Information is generally transmitted over the Internet using transmission control protocol/Internet protocol (TCP/IP) suite. The base layer of the TCP/IP suite is a physical layer, which defines the mechanical, electrical, functional and procedural standards for the physical transmission of data over communications media. Overlying the physical layer is the data link layer that provides the function and protocols to transfer data, e.g., transfer of data between clients of different networks and to detect errors that may occur at the physical layer.

Network layer protocols overlay the data link layer and provide the means for establishing connections between the networks. The standards of the network layer protocols provide operations control procedures for networking communications and routing information through multiple heterogeneous networks. Examples of the network layer protocols are the Internet protocol (IP) and Internet control message protocol (ICMP). Typically, the address resolution protocol (ARP) is used to obtain the corresponding medium access control (MAC) address for a known IP address. The ICMP is an internal protocol for passing control messages between hosts on various networks. The ICMP messages provide feedback about events in the network environment or can help determine if a path exists for a particular host in the network environment, which is generally referred to as "ping".

Typically, routing of digital packets of information may continue despite the fact that some routers are inoperative. If a host's next-hop gateway, i.e., a first gateway to the Internet host, becomes inoperative, the host may not adjust and may continue to transmit digital packets of information through a gateway that is inoperative. Hence, the host is effectively transmitting digital packets of information down a "black hole."

One prior art solution to the host to detect dead gateway uses the above described ICMP ping packet method of sending to gateways. A ping response received from the gateways indicates that they are up and running. However, most firewalls block ICMP packets, as ICMP packets can be used to probe the type of operating system, probe for the systems that are present and probe for weaknesses in a network. Further, the ICMP can serve as a launch pad for further attacks on a network and therefore they are generally blocked.

Another prior art solution uses TCP to check for dead gateways. The transport layer of the TCP/IP suite provides for end-to-end transport service across multiple heterogeneous networks. Example protocols used in this layer include, TCP, user datagram protocol (UDP) and stream control transmission protocol (SCTP). Protocols like TCP and SCTP can infer if the transmission to a host is failing. However, protocols like UDP cannot infer if the transmission to a host is failing. Further, it is difficult to detect which one of the gateways in the end-to-end transport service is dead, as this information is not available because the TCP technique is based on end-to end transportation of traffic.

Yet another prior art solution uses unicast ARP request to detect dead gateways. However, this technique works only on the Ethernet-based networks and cannot be used for non Ethernet-based networks, such as integrated services digital network (ISDN), point-to-point protocol (PPP), asymmetric digital subscriber line (ADSL) and so on. Further, the ARP can be misused for ARP spoofing, ARP flooding, and ARP table poisoning attacks and hence this technique is generally not secure.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A system and method for detecting a next-hop dead gateway is disclosed. In the following description, for purposes of explanation, numerous specific details are set forth in order to provide a thorough understanding of the various embodiments. It will be evident, however, to one skilled in the art that the various embodiments may be practiced without these specific details.

The terms "first-hop dead gateway", "dead next-hop gateway and "next-hop dead gateway" are used interchangeably throughout the document. Also, the terms "IP packet" and "dead gateway probe" are used interchangeably throughout the document.

Figure 1:
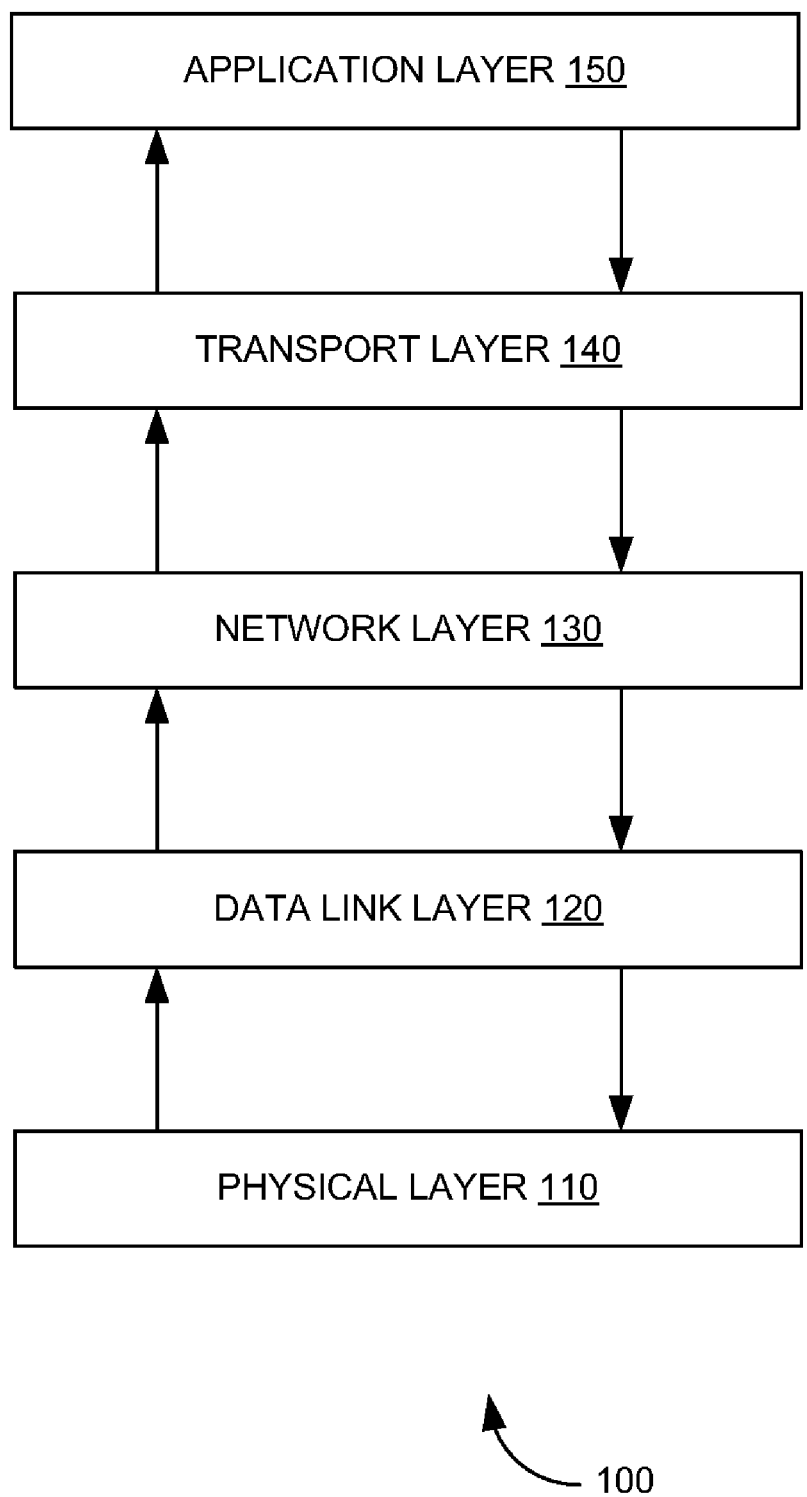
FIG. 1 illustrates a relationship diagram of layers of the transmission control protocol/Internet protocol (TCP/IP) protocol suite.

FIG. 1 illustrates a relationship diagram of layers of the transmission control protocol/Internet protocol (TCP/IP) protocol suite 100. Particularly, FIG. 1 illustrates a physical layer 110, a data link layer 120, a network layer 130, a transport layer 140, and an application layer 150. The physical layer 110 is a base layer of the TCP/IP protocol suite 100, which defines mechanical and electrical standards for physical transmission of Internet Protocol (IP) packets (e.g., the IP packet 200 illustrated in FIG. 2) over communications media. Further, overlying the physical layer 110 is the data link layer 120, which provides function and/or protocols to transfer the IP packets. For example, the data link layer 120 transfers the IP packets between clients of different networks (e.g., the networks 430A-B), and detects errors that may occur at the physical layer 110. Protocols operating at the data link layer 120 may include standard network topologies such as IEEE 802.3 Ethernet, IEEE 802.11 (Wireless LAN), integrated services digital network (ISDN), point-to-point protocol (PPP), asymmetric digital subscriber line (ADSL), and the like.

Further, the network layer 130 overlying the data link layer 120 provides the means for establishing connections between the networks. The network layer 130 also provides operational control procedures for internet working communications and routing information through multiple heterogeneous networks. For example, the network layer 130 may include an Internet protocol (IP), an address resolution protocol (ARP), or an internet control message protocol (ICMP). The ARP is used to correlate an Internet address and a medium access control (MAC) address for a particular host (e.g., the hosts 410A-F). The ICMP is an internal protocol for passing control messages between hosts on various networks. The ICMP messages provide feedback about events in the network environment and/or can help determine if a path exists to a particular host in the network environment. The Internet Protocol (IP) provides a basic mechanism for routing packets of information over the Internet.

The transport layer 140 provides end-to-end transport services across multiple heterogeneous networks. For example, the transport layer 140 includes TCP, a user datagram protocol (UDP) and a stream control transmission protocol (SCTP). The application layer 150 contains application such as file transfer protocol (FTP), telnet, etc. The above-mentioned layers are used to transmit the digital IP packets of information over the Internet using the Internet protocol.

Figure 2:
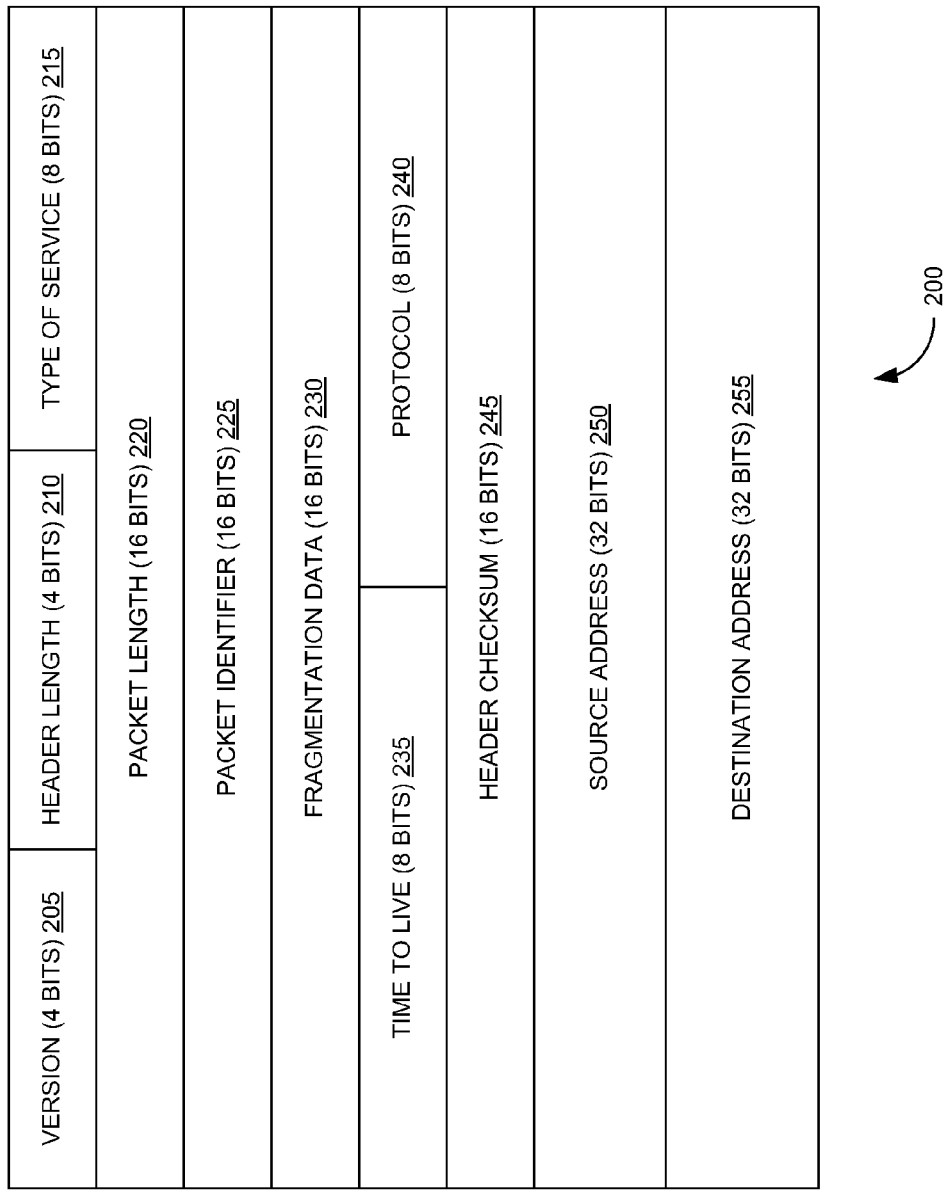
FIG. 2 illustrates an Internet protocol (IP) packet format, according to one embodiment.

FIG. 2 illustrates an IP packet format 200, according to one embodiment. Particularly, FIG. 2 illustrates a version field 205, a header length field 210, a type of service field 215, a packet length field 220, a packet identifier field 225, a fragmentation data field 230, a time to live field 235, a protocol field 240, a header checksum field 245, a source address field 250 and a destination address field 255.

The version field 205 indicates a format of an Internet header. The present technique represents the format of the Internet header in 4 bit words as shown in FIG. 2. The header length field 210 indicates length of the Internet header (e.g., in 32 bit words), and thus points to the beginning of the data. In one example embodiment, a minimum value for a correct header is 5. The type of service field 215 provides an indication of abstract parameters to achieve the desired quality of service. For example, the abstract parameters are used to guide selection of actual service parameters when transmitting the IP packet 200 through a particular network (e.g., the networks 420A-B of FIG. 4).

The packet length field 220 refers to a length of the IP packet 200 that includes the Internet header and data. The packet identifier field 225 indicates a value assigned by a sender which aids in assembling various fragments of the IP packet 200. The fragmentation data field 230 indicates where a particular fragment belongs, in the IP packet 200. The time to live field 235 indicates maximum time the IP packet 200 is allowed to remain in the Internet network. For example, if the time to live field 235 indicates a value zero, then the IP packet 200 is destroyed. As some header fields (e.g., time to live) undergo frequent changes when the Internet header is processed, the header checksum field 245 is recomputed and verified at each point during processing of the IP packet 200.

The source address field 250 indicates an IP address of a host, originating the IP packet 200. The destination address field 255 indicates an IP address of a destination or peer to which the IP packet 200 has to be ultimately sent to. The protocol field 240 holds an identification number of the transport protocol to which the IP packet 200 is handed. The payload follows the IP header and contains the data handed down from the transport layer 140.

In one example embodiment, an IP packet, henceforth referred to as a dead gateway probe is created in the following way. The source address field 250 and the destination address field 255 of the IP header are filled with an IP address of a host, which sends the dead gateway probe. The protocol field 240 is set to 253/254 (i.e., experimentation/testing). The IP payload which uniquely identifies this as a dead gateway probe can include a simple sequence like 0x123456789.

In one embodiment, if this method is used over the Ethernet or any protocol encapsulating the IP packet 200 in a MAC frame (e.g., Point to Point Protocol over Ethernet (PPPoE)), the source MAC would be that of the host and the destination MAC would be that of the router. It can be noted that if this is used over any other data link layer 120, the IP packet 200 is encapsulated in that protocol's packet and sent to a gateway. For example, let us assume that IP packet 200 is sent on the Ethernet and the host 410 has a MAC address 11:22:33:44:55:66, MAC address of the router is aa:bb:cc:dd:ee:ff and the host IP address is 192.168.1.10, then IP packet, i.e., the dead gateway probe format is as shown in FIG. 3.

Figure 3:
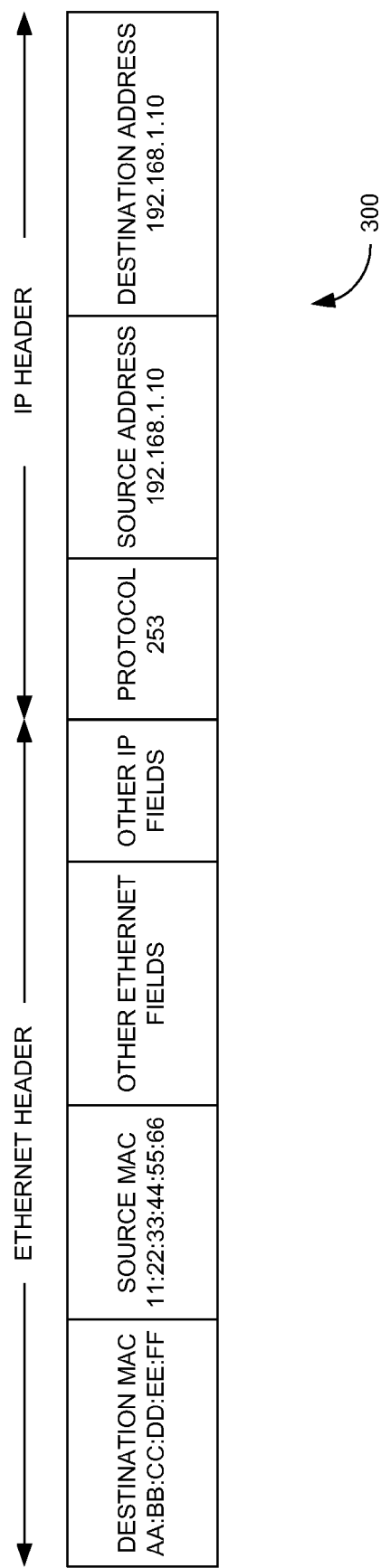
FIG. 3 is an example table illustrating various fields of the dead gateway probe format shown in FIG. 2.

FIG. 3 is an example table 300 illustrating various fields of the dead gateway probe format 200 shown in FIG. 2. Particularly, the table 300 illustrates the source MAC, the destination MAC, the source address, the destination address and other fields such as protocol field, the other Ethernet fields and the other IP fields as described in FIG. 2. It can be seen in the table 300 that the dead gateway probe format includes the same source and the destination addresses, i.e., the addresses are set to the host IP address so that the IP packet is returned to the host 410 upon sending it to the next-hop gateway 420.

Figure 4:
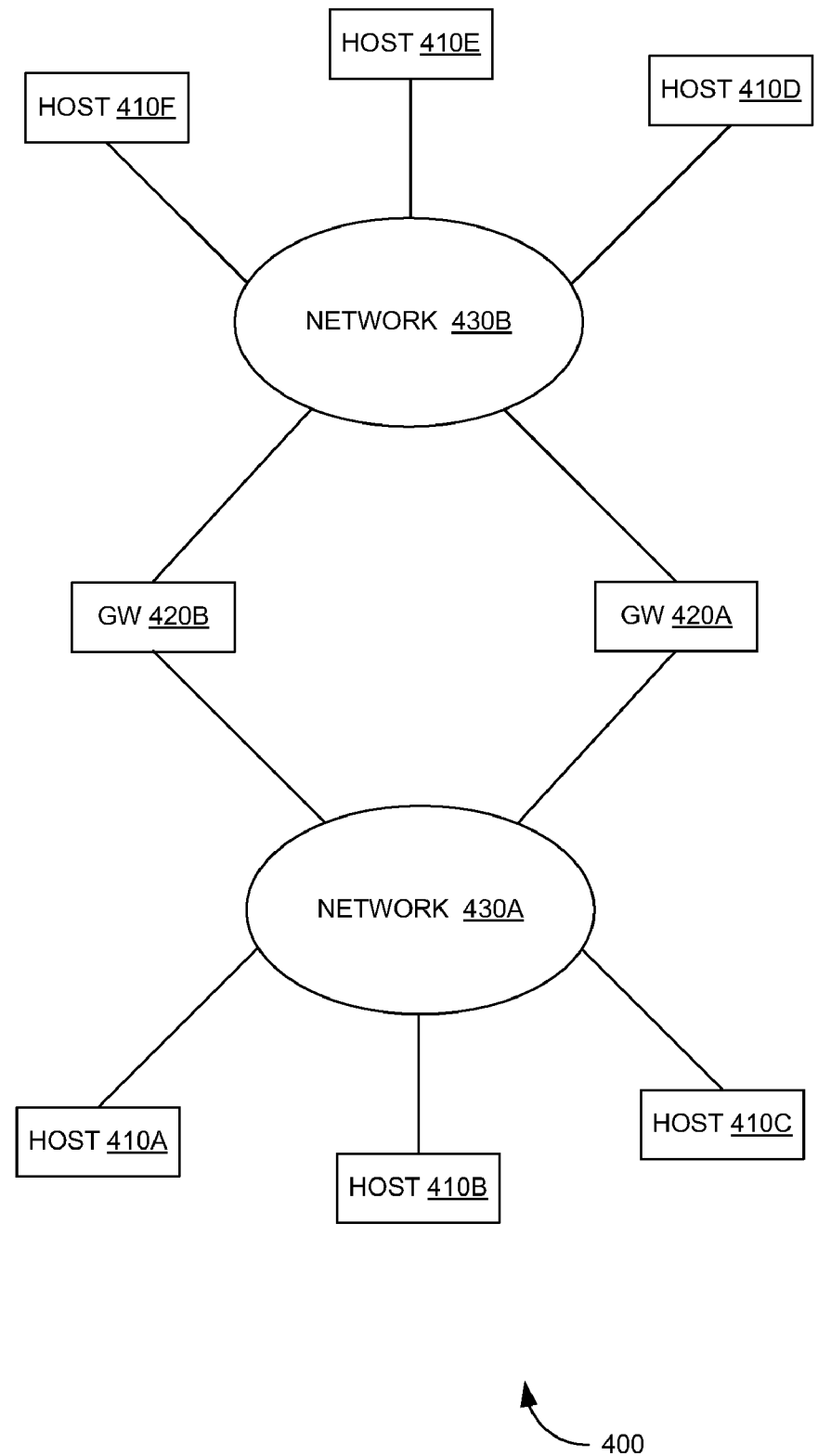
FIG. 4 is a block diagram illustrating transferring of digital packets of information between a host on one network to a host on another network, according to one embodiment.

FIG. 4 is a block diagram 400 illustrating transferring of digital IP packets of information between a host on one network to a host on another network/internet, according to one embodiment. Particularly, FIG. 4 illustrates an embodiment of a network connected to another network through a plurality of gateways (e.g., the gateways (GW) 420A-B). FIG. 4 illustrates an embodiment of the present invention where, a network 430A is connected to another network 430B (e.g., Internet) through gateways 420A-B. As shown in FIG. 4, a plurality of hosts 410D-F are coupled to the network 430B.

Hosts 410A-F may collectively or individually be referred hereinafter to as hosts 410 or host 410, respectively. Also, gateways 420A-B may collectively or individually be referred hereinafter to as gateways 420 or gateway 420, respectively. Further, networks 430A-B may collectively or individually be referred hereinafter to as networks 430 or network 430, respectively. It can be noted that any number of hosts 410 may be coupled to the networks 430. It can be further noted that one of the networks 430 may represent the Internet which is a collection of networks.

Referring to FIG. 4, each of the plurality of hosts 410 A-C of the network 430A is configured to send a packet of data (e.g., TCP and non-TCP data) to any of the plurality of hosts 410D-F of the network 430B through one of the plurality of gateways 420A-B. Each of the plurality of hosts 410D-F of the network 430B is configured to send a packet of data (e.g., TCP and non-TCP data) to any of the plurality of hosts 410A-C of the network 430A through one of the plurality of gateways 420A-B. For example, an application running on the host 410A may send a TCP or non-TCP packet of data to the host 410D, through the gateway 420A. A detailed description of the host 410 that is configured to detect a next-hop dead gateway and to find an alternative route is described in more detail with reference to FIG. 5.

Figure 5:
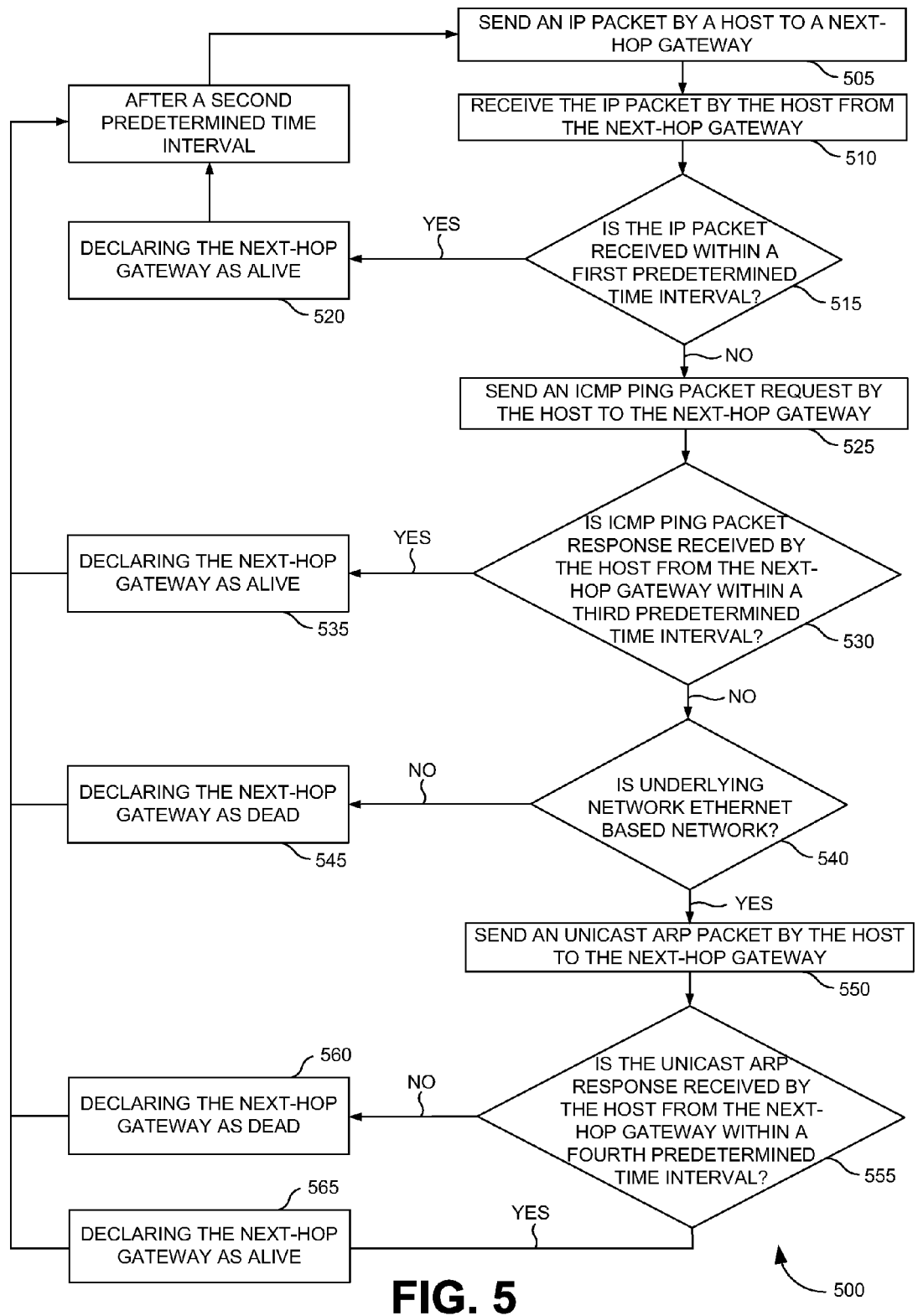
FIG. 5 is a process flow of detecting a dead next-hop gateway, according to one embodiment.

FIG. 5 is a process flow 500 of detecting a dead next-hop gateway, according to one embodiment. In operation 505, an IP packet is sent by a host 410 to a next-hop gateway 420 associated with the host 410. It is appreciated that the IP packet is encapsulated with a data link layer protocol 120 associated with the host 410 and the next-hop gateway 420. In one embodiment, source and destination fields (e.g., the source address field 250 and destination address field 255 of FIG. 2) in an IP header associated with the IP packet include an IP address associated with the host 410. In some embodiments, a protocol field (e.g., the protocol field 240 shown in FIG. 2) associated with the IP packet includes experimentation and testing code. In these embodiments, an IP payload associated with the IP packet includes a unique identifier. The unique identifier indicates that an IP packet was sent to detect the next-hop dead gateway 420.

In operation 510, the IP packet is received by a host 410 (e.g., the host 410 associated with another network 430B) from the next-hop gateway 420 upon reviewing a routing table and the destination field 255 in the IP header associated with the IP packet. In operation 515, it is determined whether the IP packet is received from the next-hop gateway 420 within a first predetermined time interval. In one example embodiment, it is determined whether the protocol field 240 and the payload field include experimentation and testing code, and the unique identifier, respectively, by the host 410. If the determination is correct, then the IP packet is declared as a packet sent to detect a next-hop dead gateway 420 by the host 410.

If it is determined that the IP packet is received from the next-hop gateway 420 within a first predetermined time interval, then the next-hop gateway 420 is declared as alive, in operation 520. The process 500 then goes to operation 505 and repeats the steps of sending the dead gateway probe by the host 410, receiving the dead gateway probe by the host 410 from the next-hop gateway 420, and determining, after a second predetermined time interval upon declaring the next-hop gateway 420 as alive.

In operation 525, an Internet control message protocol (ICMP) ping packet request is sent by the host 410 to the next-hop gateway 420, if the dead gateway probe is not received within the first predetermined time interval. In operation 530, it is determined whether an ICMP ping packet response is received by the host 410 from the next-hop gateway 420 within a third predetermined time interval. In operation 535, the next-hop gateway 420 is declared as alive and then the process 500 goes to operation 505 and repeats the steps, if the ping response is received by the host 410 within the third predetermined time interval. If the ping response is not received by the host 410 within the third predetermined time interval, then the process 500 performs the operation 540. In operation 540, a determination is made to check whether the underlying network is an Ethernet based network or not. If the underlying network is not Ethernet based network, then the next-hop gateway 420 is declared as dead and the operating system associated with the host 410 is notified accordingly. As shown in FIG. 5, the process 500 repeats the operation 500-565 to check if the previously dead next-hop gateway 420 is alive.

If it is determined that the underlying network is the Ethernet based network, then operation 550 is performed. In operation 550, a unicast address resolution protocol (ARP) request packet is sent by the host 410 to the next-hop gateway 420. In operation 555, it is determined whether the unicast ARP response is received by the host 410 from the next-hop gateway 420 within a fourth predetermined time interval. If it is determined that the unicast ARP response is not received by the host 410 from the next-hop gateway 420 within the fourth predetermined time interval, then the next-hop gateway is declared as dead and the operating system of the host 410 is notified accordingly, else the next-hop gateway 420 is declared as alive in operation 565. Upon performing operation 560 or 565, the process 500 repeats the steps of sending the IP packet by the host 410, receiving the IP packet by the host 410, and determining after a second predetermined time interval.

In some embodiments, the process 500 determines whether there is another next-hop gateway 420 associated with the host 410. The process 500 repeats the steps of sending the IP packet by the host 410, receiving the IP packet by the host 410, and determining irrespective of the determination of whether or not, there is a next-hop gateway 420 associated with the host 410. In one example embodiment, if there is another next-hop gateway 420, then the process 500 repeats the above steps on the determined other next-hop gateway 420 and if it is determined that there is no other next-hop gateway 420, the process 500 repeats itself after a pre-determined time on the dead next-hop gateway to determine if the next-hop dead gateway 420 is alive.

One skilled in the art can envision that the above process 500 can repeat itself by selecting an alternate next-hop gateway 420 associated with the host 410 (e.g., upon declaring the next-hop gateway 420 as dead) to send a packet of data from the host 410.

Figure 6:
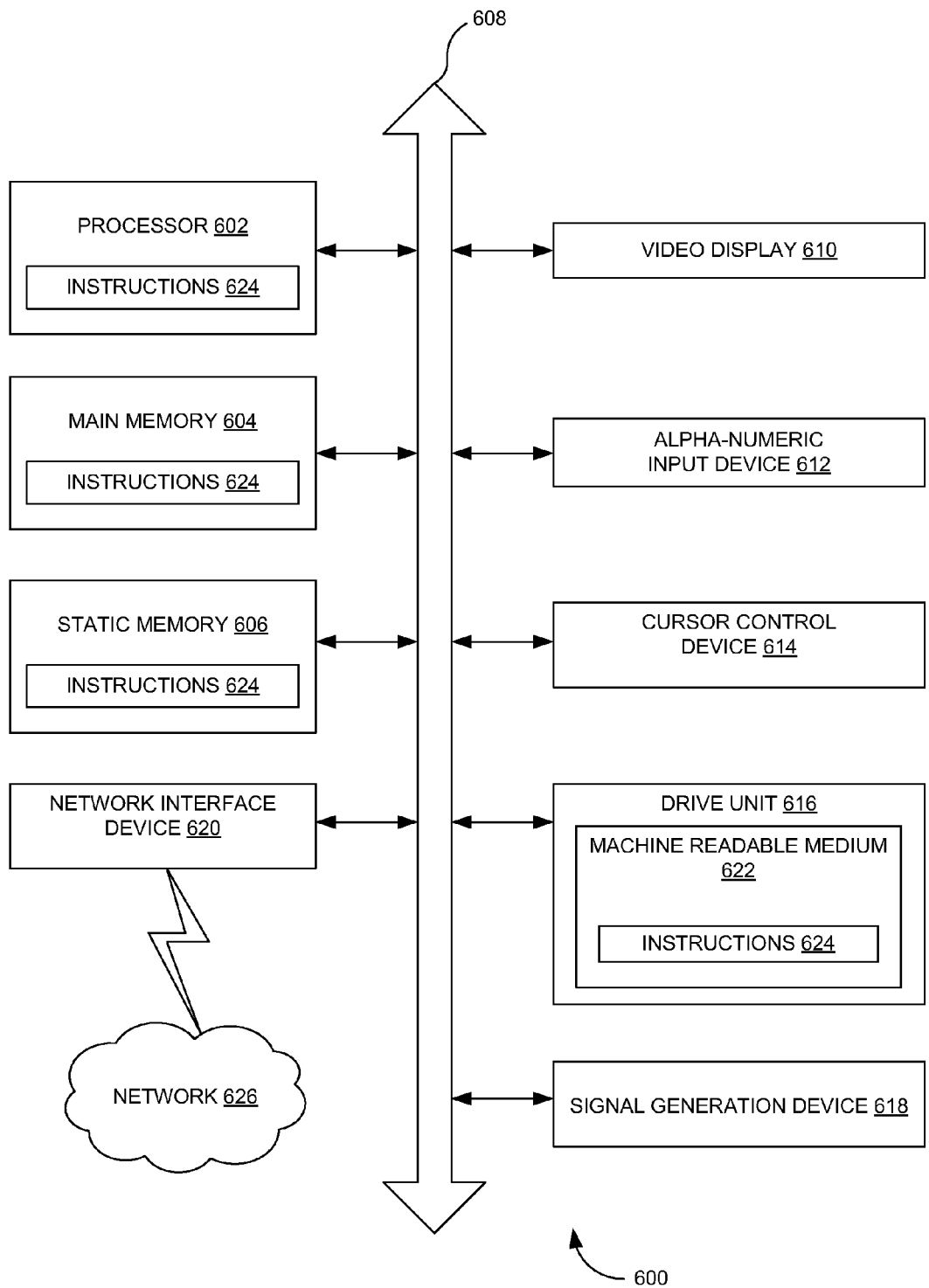
FIG. 6 is a diagrammatic system view of a data processing system in which any of the embodiments disclosed herein may be performed, according to one embodiment.

FIG. 6 is a diagrammatic system view 600 of a data processing in which any of the embodiments disclosed herein may be performed, according to one embodiment. Particularly, the diagrammatic system view of FIG. 6 illustrates a processor 602, a main memory 604, a static memory 606, a bus 608, a video display 610, an alpha-numeric input device 612, a cursor control device 614, a drive unit 616, a signal generation device 618, a network interface device 620, a machine readable medium 622, instructions 624 and a network 626.

The diagrammatic system view 600 may indicate a personal computer and/or a data processing system in which one or more operations disclosed herein are performed. The processor 602 may be a microprocessor, a state machine, an application specific integrated circuit, a field programmable gate array, etc. The main memory 604 may be a dynamic random access memory and/or a primary memory of a computer system. The static memory 606 may be a hard drive, a flash drive, and/or other memory information associated with the data processing system.

The bus 608 may be an interconnection between various circuits and/or structures of the data processing system. The video display 610 may provide graphical representation of information on the data processing system. The alpha-numeric input device 612 may be a keypad, keyboard and/or any other input device of text (e.g., a special device to aid the physically handicapped). The cursor control device 614 may be a pointing device such as a mouse. The drive unit 616 may be a hard drive, a storage system, and/or other longer term storage subsystem.

The signal generation device 618 may be a BIOS and/or a functional operating system of the data processing system. The network interface device 620 may perform interface functions (e.g., code conversion, protocol conversion, and/or buffering) required for communications to and from the network 626 between a number of independent devices (e.g., of varying protocols). The machine readable medium 622 may provide instructions on which any of the methods disclosed herein may be performed. The instructions 624 may provide source code and/or data code to the processor 602 to enable any one or more operations disclosed herein.

For example, a storage medium having instructions, that when executed by a computing platform, result in execution of the method of detecting the next-hop dead gateway 420, including sending the IP packet by the host 410 to the next-hop gateway 420 associated with the host 410, receiving the IP packet by the host 410 from the next-hop gateway 420 upon reviewing a routing table and a destination field in IP header associated with the IP packet, determining whether the IP packet is received from the next-hop gateway 420 within a first predetermined time interval, declaring the next-hop gateway 420 as alive if the IP packet is received within the first predetermined time interval, and declaring the next-hop gateway 420 as dead if the IP packet is not received within the first predetermined time interval.

In some embodiments, determining whether the IP packet is received from the next-hop gateway 420 within the first predetermined time interval includes determining whether the protocol field and the payload field include experimentation and testing code, and the unique identifier, respectively, by the host 410, declaring the IP packet as a packet sent to detect a next-hop dead gateway by the host 410 if the protocol field and the payload field include experimentation and testing code, and the unique identifier, respectively, determining whether the IP packet is received within the first predetermined time interval, and declaring the next-hop gateway 420 as alive if the IP packet is received within the first predetermined time interval.

Furthermore, a computer system includes a plurality of hosts, a plurality of gateways coupled to the plurality of hosts, and a memory coupled to one of the plurality of hosts, the memory having stored therein code which when decoded by the one of the plurality of hosts, the code causes the one of the plurality of hosts to perform a method for detecting a next-hop dead gateway, the method includes sending an IP packet by a host (e.g., the host 410 associated with the first network 430A) to a next-hop gateway 420 associated with the host 410 and in which source and destination fields in a IP header associated with the IP packet includes an IP address associated with the host 410, receiving the IP packet by the host 410 from the next-hop gateway 420 upon reviewing a routing table and a destination field in the IP header associated with the IP packet, determining whether the IP packet is received from the next-hop gateway 420 within a first predetermined time interval, if so, declaring the next-hop gateway 420 as alive, and if not, declaring the next-hop gateway 420 as dead.

In some embodiments, determining whether the IP packet is received from the next-hop gateway 420 within the first predetermined time interval includes determining whether the protocol field and the payload field include experimentation and testing code, and the unique identifier, respectively, by the host 410, declaring the IP packet as a packet sent to detect a next-hop dead gateway by the host 410 if the protocol field and the payload field include experimentation and testing code, and the unique identifier, respectively, determining whether the IP packet is received within the first predetermined time interval, and declaring the next-hop gateway 420 as alive if the IP packet is received within the first predetermined time interval.

The above-described technique provides a mechanism for detecting a next-hop dead gateway. The above technique performs at the network layer 130, i.e., at the IP level, and is therefore independent of the lower layer protocol requirements. The technique works on sending an IP packet to detect a next-hop dead gateway. It can be noted that any packet capturing tool can be used to analyze the received IP packets and detect the dead gateway probe. This technique can also be used for non Ethernet based networks such as wireless local area network (LAN), integrated services digital network (ISDN), point-to-point protocol (PPP), asymmetric digital subscriber line (ADSL) networks. The technique detects failure of a next-hop dead gateway that is listed in its route cache and selects an alternative next-hop gateway associated with the host. It is a reliable way of detecting next-hop dead gateways, so as to prevent breakdown in transmission of data.

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method for detecting a next-hop dead gateway, comprising:

sending an Internet Protocol (IP) packet by a host to a next-hop gateway associated with the host, and wherein source and destination fields in IP header associated with the IP packet includes IP address associated with the host, and wherein protocol field associated with the IP packet includes experimentation and testing code, and wherein IP payload field associated with the IP packet includes a unique identifier that indicates an IP packet is sent to detect the next-hop dead gateway;

receiving the IP packet by the host from the next-hop gateway upon reviewing a routing table and the destination field in the IP header associated with the IP packet;

determining whether the IP packet is received from the next-hop gateway within a first predetermined time interval, wherein determining whether the IP packet is received from the next-hop gateway within the first predetermined time interval comprises:

determining whether the protocol field and the IP payload field include the experimentation and testing code, and the unique identifier, respectively, by the host;

if so, then declaring the IP packet as a packet sent to detect a next-hop dead gateway by the host; and determining whether the IP packet is received within the first predetermined time interval;

if so, declaring the next-hop gateway as alive; and if not, declaring the next-hop gateway as dead.

2. The method of claim 1, further comprising:
encapsulating the IP packet with a data link layer protocol associated with the host and the next-hop gateway.

3. The method of claim 1, further comprising:
sending an Internet control message protocol (ICMP) ping packet request by the host to the next-hop gateway if the IP packet is not received within the first predetermined time interval;
determining whether a ICMP ping packet response is received by the host from the next-hop gateway within a third predetermined time interval; and
declaring the next-hop gateway as alive if the ping response is received within the third predetermined time interval.

4. The method of claim 3, further comprising:
determining whether the underlying network is Ethernet based network if the ping response is not received within the third predetermined time interval; and
if not, declaring the next-hop gateway as dead.

5. The method of claim 4, further comprising:
sending a unicast address resolution protocol (ARP) request packet by the host to the next-hop gateway if the underlying network is Ethernet based network;
determining whether the unicast ARP response is received by the host from the next-hop gateway within a fourth predetermined time interval;
if not, then declaring the next-hop gateway as dead and repeating sending the IP packet by the host, receiving the IP packet by the host, and determining steps after a second predetermined time interval; and
if so, declaring the next-hop gateway as alive and repeating sending the IP packet by the host, receiving the IP packet by the host, and determining steps after a second predetermined time interval.

6. The method of claim 1, further comprising:
determining whether there is another next-hop gateway associated with the host;
if not, repeating sending the IP packet by the host, receiving the IP packet by the host and the determining steps to determine if the next-hop dead gateway is alive; and
if so, repeating sending the IP packet by the host, receiving the IP packet by the host, and the determining steps on the determined other next-hop gateway.

7. The method of claim 1, further comprising:
selecting an alternate next-hop gateway associated with the host upon declaring the next-hop gateway as dead to send a packet of data from the host.

8. An article, comprising:
a storage medium having instructions, that when executed by a computing platform, result in execution of method of detecting a next-hop dead gateway, comprising:
sending an IP packet by a host to a next-hop gateway associated with the host and, wherein source and destination fields in IP header associated with the IP packet includes IP address associated with the host, and wherein protocol field associated with the IP packet includes experimentation and testing code, and wherein IP payload field associated with the IP packet includes a unique identifier that indicates an IP packet is sent to detect the next-hop dead gateway;
receiving the IP packet by the host from the next-hop gateway upon reviewing a routing table and the destination field in the IP header associated with the IP packet;
determining whether the IP packet is received from the next-hop gateway within a first predetermined time interval, wherein determining whether the IP packet is received from the next-hop gateway within the first predetermined time interval comprises:
determining whether the protocol field and the IP payload field include the experimentation and testing code, and the unique identifier, respectively, by the host;
if so, then declaring the IP packet as a packet sent to detect a next-hop dead gateway by the host; and
determining whether the IP packet is received within the first predetermined time interval;
if so, declaring the next-hop gateway as alive; and
if not, declaring the next-hop gateway as dead.

9. The article of claim 8, further comprising:
encapsulating the IP packet with a data link layer protocol associated with the host and the next-hop gateway.

10. The article of claim 8, further comprising:
selecting an alternate next-hop gateway associated with the host upon declaring the next-hop gateway as dead to send a packet of data from the host.

11. A computer system comprising:
a plurality of hosts;
a plurality of gateways coupled to the plurality of hosts; and
a memory coupled to one of the plurality of hosts, the memory having stored therein code which when decoded by the one of the plurality of hosts, the code causes the one of the plurality of hosts to perform a method for detecting a next-hop dead gateway, comprising:
sending an IP packet by a host to a next-hop gateway associated with the host, and wherein source and destination fields in IP header associated with the IP packet includes IP address associated with the host, and wherein protocol field associated with the IP packet includes experimentation and testing code, and wherein IP payload field associated with the IP packet includes a unique identifier that indicates an IP packet is sent to detect the next-hop dead gateway;
receiving the IP packet by the host from the next-hop gateway upon reviewing a routing table and the destination field in the IP header associated with the IP packet;
determining whether the IP packet is received from the next-hop gateway within a first predetermined time interval, wherein determining whether the IP packet is received from the next-hop gateway within the first predetermined time interval comprises:
determining whether the protocol field and the IP payload field include the experimentation and testing code, and the unique identifier, respectively, by the host;
if so, then declaring the IP packet as a packet sent to detect a next-hop dead gateway by the host; and
determining whether the IP packet is received within the first predetermined time interval;
if so, declaring the next-hop gateway as alive; and
if not, declaring the next-hop gateway as dead.

* * * * *

UNITED STATES PATENT AND TRADEMARK OFFICE
CERTIFICATE OF CORRECTION

| | | |
|---|---|---|
| PATENT NO. | : 7,969,894 B2 | Page 1 of 1 |
| APPLICATION NO. | : 12/141942 | |
| DATED | : June 28, 2011 | |
| INVENTOR(S) | : Premnath Mangal | |

It is certified that error appears in the above-identified patent and that said Letters Patent is hereby corrected as shown below:

In column 6, line 42, delete "in" and insert -- system in --, therefor.

Signed and Sealed this
Twenty-seventh Day of March, 2012

David J. Kappos
*Director of the United States Patent and Trademark Office*